(12) United States Patent
Jaynes

(10) Patent No.: US 6,491,782 B1
(45) Date of Patent: Dec. 10, 2002

(54) METHOD OF PRODUCING FOIL LAMINATE WITH DOUBLE-SIDED PRINTING

(76) Inventor: Dennis Jaynes, 12345 Hickory Ct., Hartley, IL (US) 60142

(*) Notice: Subject to any disclaimer, the term of this patent is extended or adjusted under 35 U.S.C. 154(b) by 60 days.

(21) Appl. No.: 09/704,976

(22) Filed: Nov. 2, 2000

(51) Int. Cl.[7] .......................... B41M 3/00; B41M 7/02; B32B 31/18; B32B 31/12; B32B 15/08

(52) U.S. Cl. .................. 156/277; 156/289; 156/250; 156/182; 427/180; 428/42.1; 428/195; 428/201; 428/209; 428/457

(58) Field of Search .................. 156/230, 233, 156/235, 237, 246, 241, 247, 277, 289, 250, 182, 278, 283; 427/146, 147, 148, 180, 212; 428/40.7, 41.2, 41.7, 195, 200, 201, 203, 207, 209, 914, 915, 411.1, 457, 461, 480, 500, 515, 42.1; 235/487, 488, 493

(56) References Cited

U.S. PATENT DOCUMENTS

| | | |
|---|---|---|
| 3,494,818 A | 2/1970 | Marchese |
| 3,510,388 A * | 5/1970 | Hunt et al. .................. 428/164 |
| 3,809,568 A | 5/1974 | Thomas |
| 3,812,328 A | 5/1974 | Tramposch |
| 4,022,943 A | 5/1977 | Erb et al. |
| 4,072,592 A | 2/1978 | Due et al. |
| 4,318,554 A | 3/1982 | Anderson |
| 4,479,995 A | 10/1984 | Suzuki |
| 4,481,160 A | 11/1984 | Bree |
| 4,500,373 A | 2/1985 | Kubota |
| 4,544,590 A * | 10/1985 | Egan ............................ 428/40 |
| 4,575,127 A | 3/1986 | Michel |
| 4,642,959 A | 2/1987 | Swiech, Jr. et al. |
| 4,659,112 A | 4/1987 | Reiner et al. |
| 4,671,839 A | 6/1987 | Finkel et al. |
| 4,673,626 A | 6/1987 | Takeda et al. |
| 4,680,459 A | 7/1987 | Drexler |
| 4,684,795 A | 8/1987 | Colgate, Jr. |
| 4,686,133 A | 8/1987 | Nakabayashi et al. |
| 4,692,402 A | 9/1987 | Bouldin et al. |
| 4,745,268 A | 5/1988 | Drexler |
| 4,767,647 A | 8/1988 | Bree |
| 4,773,677 A | 9/1988 | Plasse |
| 4,897,533 A * | 1/1990 | Lyszczarz .................. 235/487 |
| 5,098,527 A | 3/1992 | Banks et al. |
| 5,249,828 A | 10/1993 | Axelrod |
| 5,399,217 A | 3/1995 | Bloom |
| 5,587,037 A * | 12/1996 | Fellner ....................... 156/231 |
| 5,589,021 A | 12/1996 | Bloom |
| 5,653,844 A | 8/1997 | Abrams |
| 5,656,362 A | 8/1997 | Abrams |
| 5,693,416 A | 12/1997 | Kucherovsky |
| 5,785,355 A * | 7/1998 | Main ........................... 238/108 |
| 5,946,781 A | 9/1999 | Kuo |

FOREIGN PATENT DOCUMENTS

JP    09/234976    *  9/1997    ........... B42D/15/00

* cited by examiner

*Primary Examiner*—J. A. Lorengo
(74) *Attorney, Agent, or Firm*—Leon I. Edelson; William C. Clarke; Levenfeld Pearlstein

(57) ABSTRACT

The present invention relates to a method for producing a multi-layered foil laminate having at least two layers, both layer printed on the outer sides by conventional lithography offset halftone printing, one layer comprising a plastic material film, a second layer comprising a metal foil adhering securely to a plastic material film, the metal foil bonded to the plastic film material by a heat-acted dry bond adhesive. The two layer bonded together. The two-layer embodiment is over laminated with a plastic film material and severed into predetermined segments, which can be embossed and finished with a scratch off or ultra-graphic coating to enhance appearance and utility.

9 Claims, 1 Drawing Sheet

METHOD OF PRODUCING FOIL LAMINATE WITH DOUBLE-SIDED PRINTING

FIELD OF THE INVENTION

The present invention relates to a method for producing a multi-layered foil laminate having at least two layers, both layers printed on one side and serving as outside layers providing identifying indicia through an exterior transparent plastic film, the printing being by conventional offset half tone lithography printing. The invention is also directed to a novel multi-layered foil laminate having two outside layers fused together with over-laminating film and provided with printing on both sides of the foil laminate.

The use of foil laminates, which possess an external clear plastic surface to protect a printed surface and identifying indicia, is well known. The attractiveness of a metallic surface is generally recognized but such surfaces with printed indicia are subject to erosion with normal use without protective covering. Typical applications are credit cards, identification cards and similar uses.

BACKGROUND OF THE INVENTION

The use of foil laminates, which possess an external clear plastic surface to protect a printed surface and identifying indicia, is well known. The attractiveness of a metallic surface is generally recognized but such metal surfaces with printed indicia are subject to smearing, smudging, or distortion of the wet ink as the printed metallic surfaces are handled during printing and further processing. In the prior art, metallic foil is taught as a laminate with an exterior plastic layer, which serves as the printing surface and as a protective outer layer. Reverse printing of the plastic layer which protects the metallic foil is used to provide print indicia on the inside of the plastic layer adjacent to the surface of the metallic foil, to avoid printing directly on the metallic foil.

DESCRIPTION OF THE PRIOR ART

Laminates with double-sided printing are known in the prior art. U.S. Pat. No. 5,653,844 teaches a method of double-sided printing on both surfaces of an outer layer of a foil laminate. The method of double-sided printing includes initially printing on the first side of an outer layer of a plastic film material wherein the printing is imparted to the side or surface of the plastic film material facing towards an underlying metallic foil to which it is to be adhered and the printing is applied to the plastic film material through the intermediary of either reverse or other suitable halftone color printing. Subsequently, the plastic material is bonded at the printed surface to the underlying metallic foil and a further printing is applied to the exterior surface of the outer plastic film layer. Thermal transfer printing is applied so as to not form any impressions on the foil laminate.

It is known to apply a clear vinyl film such as PVC over the printing on a vinyl core such as PVC under heat and pressure in a hydraulic laminating press. U.S. Pat. No. 4,897,533 teaches a method of preparing a credit card with a printed metallic surface protected by a transparent plastic film, which is bonded to the metal containing surface by a heat-activated adhesive, the metallic surface in the form of metal foil bonded to a plastic substrate under the application of heat and pressure in a hydraulic laminating press. U.S. Pat. No. 4,897,533 teaches the method of printing upon the metallic foil is by silk-screen printing with ultraviolet curable ink, the ink being cured immediately upon application of ultraviolet light. The use of conventional offset lithography printing is taught as not practical, especially in an automated process since the details of the graphics tend to blur and the processing of a plastic substrate with a metallized surface is problematical and unpredictable in results because the laminate in effect becomes a capacitor for storing static electricity generated during processing such as printing. U.S. Pat. No. 4,897,533 teaches that problems in breakage of the thin metalized surface and/or lack of clarity can be encountered in the application of a protective film over a metallic surface applied on the plastic core of a credit card.

It is an object of this invention to provide a double sided multiple layer double printed laminate which provides an attractive metal surface with printed indicia which printing is protected against erosion and normal usage by a transparent plastic film.

It is an object of this invention to provide a double sided multiple layer double printed laminate using conventional offset lithographic printing on a metal foil—plastic layered laminate and on a plastic film substrate, which are collated to form the double-sided multiple layer double printed laminate.

It is an object of this invention to provide a method for preparing a double sided multiple layer double printed laminate using conventional offset half tone lithography printing on a metal foil-plastic layered laminate and on a plastic film substrate, the metal foil-plastic laminate with printing on the metal foil and the printed plastic film substrate being collated and laminated together to form the double sided multiple layer double printed laminate.

SUMMARY OF THE INVENTION

This invention relates to a multi-layered foil laminate having at least two printed layers, one printed layer consisting of a printed metal foil upon a plastic film substrate, a second printed layer comprising a printed plastic film, the one printed layer consisting of a printed metal foil upon a plastic film substrate comprising a laminate, the two layers, one comprising a laminate, the second comprising a printed plastic film, being collated together and laminated together to form a multi-layered foil laminate. This invention relates to the process for preparing the multi-layered foil upon a plastic film substrate laminate with two printed layers, one layer comprising a printed metal foil upon a plastic film substrate and one layer comprising a printed plastic film, the printing by conventional offset half tone lithography printing, and to the multi-layered foil laminate prepared thereby.

DETAILS OF THE INVENTION

Figure 1:
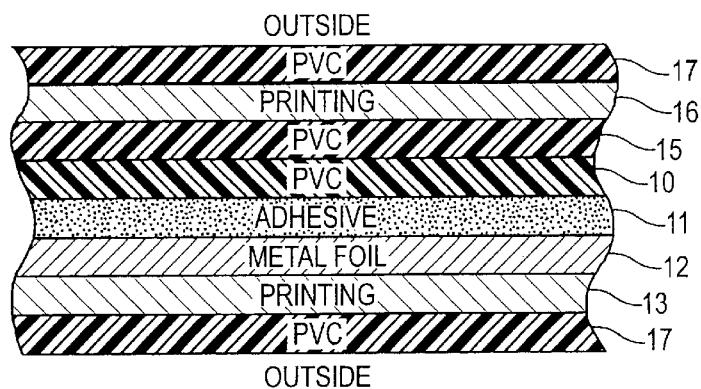
FIG. 1 is a cross-sectional view of a preferred embodiment of the multi-layer foil laminate having at least two printed layers.

Referring now to the drawings, FIG. 1 is a cross-sectional view of the multi-layered foil laminate wherein the thickness of the foil laminate has been enlarged for illustration purposes. The foil laminate with two printed surfaces comprises two substrates, each with printed indicia which are laminated together to form a single unitary product. The foil laminate consists of a plastic printed stock of 13 mil PVC, 15 and printing 16, and a metal foil 12 with heat activation adhesive 11 laminated to plastic stock 10, of 13 mil PVC, which form the two substrates. The two substrates are laminated together with over-laminating film, 17, which is a transparent PVC film of overall thickness from 1 to about 6 mil, preferably about 2 mil. The printing is by conventional offset half tone lithography on a sheet fed press. The over-laminating film may have a magnetic foil applied on the inside of the film. Thus, the two printed surfaces have clear transparent scratch-resistant protective surfaces over the printed indicia.

Figure 2:
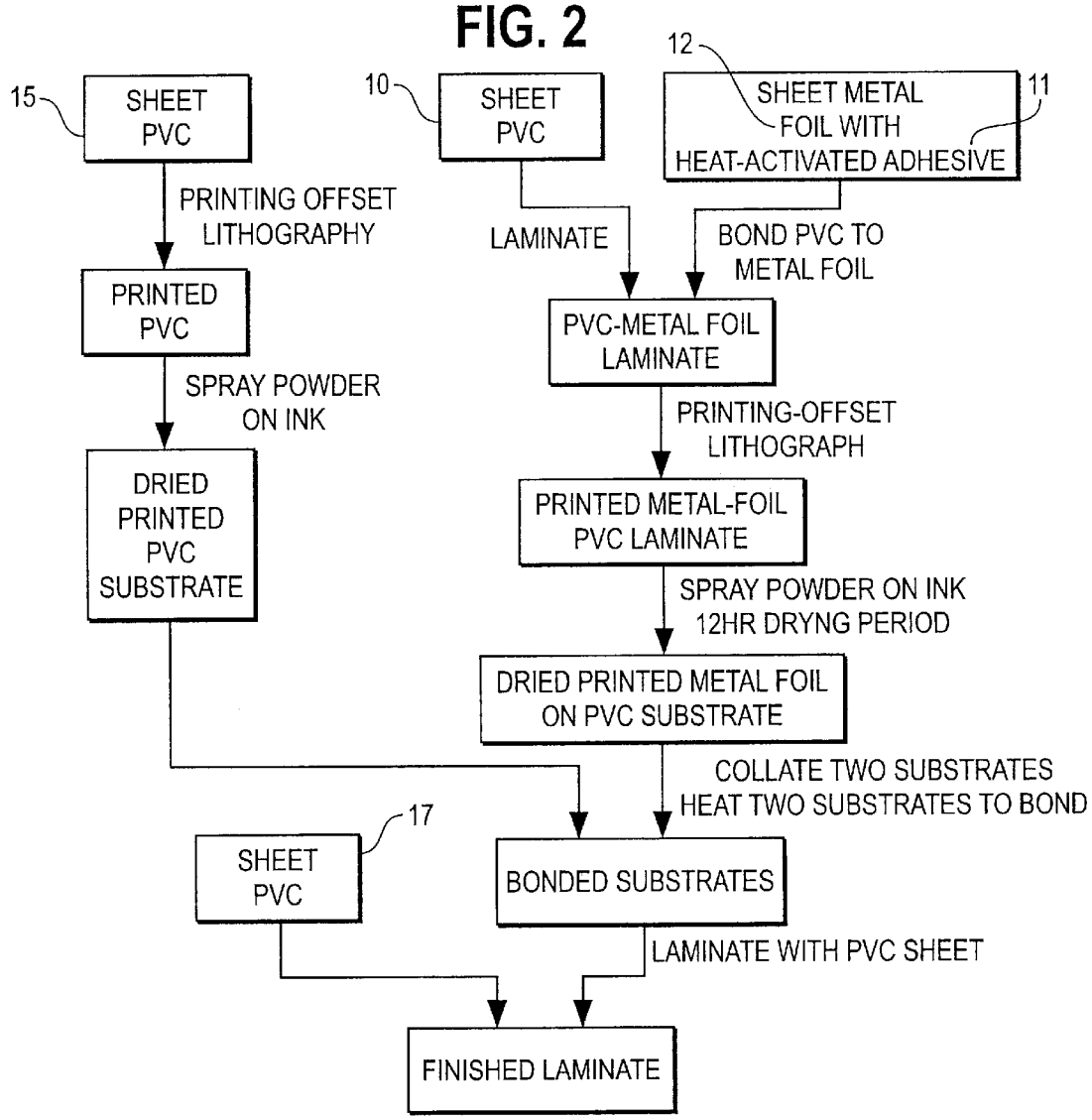
FIG. 2 is a block diagram representing the steps of a preferred embodiment of the present invention for producing a multi-layered foil laminate having at least two printed layers.

The method of making the foil laminate with two printed surfaces protected by a clear transparent scratch resistant protection surface is shown in FIG. 2, which comprises the steps of providing a first plastic substrate 10 of PVC, providing the metal foil 12 with the heat-activated adhesive as a layer adhered to the metal foil as 11 and providing printed indicia 13 on metal foil 12, followed by providing a second plastic substrate 15 of PVC and providing printed indicia 16 on plastic substrate 15. The substrate comprising 10, 11, 12 and 13 embody a separate laminate with printing 13 on a metallic foil 12. The two substrates are collated and laminated together with over-laminating film 17 of PVC preferably 2 mil. The plastic substrates and metal foil are in the form of large sheets of the thickness described. Multiple printed indicia are printed upon the substrates. A plurality of individual foil laminates can be die cut to card size from the large laminated sheets after the over-laminating film 17 is applied. The individual cards can be further finished by embossing, application of signature panels or holograms, etc., including embossing each segment with an applied scratch off or "ultra-graphic indicia" to enhance appearance or utility.

The substrate PVC sheet 15 and the substrate metal foil 17 as a laminate layer adhering to PVC sheet 10 by adhesive 11 are printed separately using a conventional offset lithography process. The metal foil is initially provided as a continuous sheet or web from a suitable supply roll or the like which has one surface of the sheet provided with a suitable adhesive so as to adhesively contact and be bonded to the plastic substrate, preferably a clean PVC film of 13 mil thickness to provide support for the metal foil without cracking during the printing step. The PVC film, in turn, is adapted to be bonded to the metal foil by possessing a dyne level of 36° or more above the energy level and a surface roughness measured in microinches by an RA meter of within the range of 60 to 90 RA, defined as roughness average of the surface of the plastic, measured with a RA meter (roughness meter), as well-understood in the plastics industry.

Examples of suitable metal foil include aluminum foil sheets manufactured under the trade name Spectratec® by the Rainbow Holosheen Company®. The foregoing metal foil sheets have a thickness of approximately one (1) mil, preferably from about 0.05 mm to about 1.5 mm, more preferably from about 0.07 mm to 0.08 mm. It will be appreciated that foils of different materials, such as gold or silver or bronze, and having a different thickness are contemplated for use in the present invention. The adhesive coatings are activated within a temperature range of from 110° F. to 140° F. Typical adhesives are formulated for adherence for designated plastic substrates such as PVC, which requires specific adhesive properties. It is accordingly preferable that the metal foil has a suitable adhesive coating for the substrate, which in this invention is PVC.

Examples of suitable PVC film sheets include PVC film sheets manufactured under the trademarks Nanya® or Empire®. Thickness is preferably within a range of from 8 to 24 mil. more preferably about 13 mil and with specified surface roughness to provide or improve printability.

An ink to be satisfactory for printing metal foils on plastic substrates must form a clear, sharp print with good covering power, adhere tenaciously to the metal foil and withstand the wrinkling and creasing to which the metal foil may be subjected during processing. It is preferable that the ink be of such nature as not to require excessive heat or prolonged exposure to heat to effect satisfactory adherence to the metal foil by the ink since prolonged exposure to heat or excessive heat can cause the plastic substrate to deform or otherwise distort. A suitable ink includes ink manufactured by Superior® which has the required high tack, low wax content and imparts sufficient free energy to the smooth surface to form an adequate adhesive bond, not only under wet conditions but when the ink is thoroughly dry and the print has aged. Other suitable inks include inks manufactured by Handschy®, which also provide the high tack, low wax requirements. Similar inks are required for printing on the PVC film sheets, which also require characteristics of high tack, low wax and are suitable for printing on PVC film.

The over-laminating PVC film for laminating the two layers can include over-laminating PVC sheets manufactured by Empire® or Nanya® wherein the film thickness is within the range of from 1 mil to about 6 mil. preferably about 2 mil. The over-laminating PVC film is preferably clear, transparent and has the necessary properties of being heat-sealable, is durable at the heat seal as well as durable over the complete film, has low permeability to oxygen, carbon dioxide and gases in general and is a material that has strength and flexibility at both room temperature and low temperature.

The method of making the multi-layered foil laminate having at least two layers is shown in FIG. 2 in a block diagram of the preparation of a metal foil card with a metallic surface on one side and a standard PVC plastic film on the other side using standard offset half tone lithography printing on a sheet fed press and finished with standard methods at temperatures within the range of from 290° F. to 310° F. with polished plates in the laminating step with a short dwell of time of from 6 to 8 minutes under pressure of 1200 to 1500 p.s.i.

Referring now to FIG. 2, where the drawing is for the purpose of illustrating a preferred embodiment of the invention only and not for the purpose of limiting the invention, FIG. 2 shows a block diagram illustrating the basic steps of the preferred method of the present invention.

Referring to the steps of preparing the printed metal foil on the PVC substrate, a metal foil sheet 12 with one surface of the metal foil provided with a suitable heat-actuated adhesive is secured and bonded to sheet medium 10 with a roll laminator at a temperature within the range of from 110° F. to about 140° F. As noted, the PVC comprising sheet medium 10 must have a dyne level of 36° or above with an RA of 60 to 90, to provide a suitable substrate for metal foil adherence.

The PVC-metal foil laminate is advanced to a conventional sheet fed offset half tone lithography printing press to print indicia upon the metal foil surface of the laminate. The indicia may be in colored halftones or solid and may also include a further color or print layer therebeneath forming a colorated or contrasting background, for instance, such as white or any other suitable color. The ink, as noted, must be a high tack, low wax PVC ink to apply a four-color image on top of the metal foil laminate to yield a printed metal foil sheet. This printing process is performed by utilizing cyan, magenta, yellow and black separations and plates. The preferred ink hues are cyan 20–32, magenta 44–55, yellow 6–11, gray—C/M/Y-16 or under, in order that the color reproduction will match the original color of the artwork. Standard offset plates with 175 to 200 line screen, curved to compensate for excess dot gain by 17% are preferable to reproduce the original indicia on the metal foil to avoid excess dot gain at standard densities. Conductivity of the water used in the offset lithography printing is preferably within the range of from about 2000 to 3000 mhos per centimeter to print on metal foil as a fountain solution (water). Conductivity over 3600 or 4400 mhos per centimeter can prevent printing or drying printed indicia on metal foil. The form rollers are preferably not in excess of 35 durometers. Otherwise, the printed indicia can indicate excess dot gain, color streaks, and poor color reproduction with excess plate wear with overall inadequate reproduction of the original. The compressible blankets are preferably packed at 1 mil under the bearers to obtain print quality and to avoid too much dot gain and broken image areas on the metal foil. To obtain the required color and detail of the imprint on the metal foil, the preferable dot gain is 175 line screen (under 31 cyan/under 31 magenta/under 29 yellow/under 33K/under 33 P.M.C., and ink film thickness via densitometer is preferably cyan 1.00–1.30/magenta 1.10–1.40/yellow 0.80–1.10/black 1.35–1.70. Examples of suitable printing presses include the Heidelberg Speedmaster offset printer (model nos. 72S+L and 102 S+L). It will be appreciated that printing processes other than a four color ink printing processes are also suitable, including printing processes which use fewer or greater numbers of ink colors.

Immediately after the printing step, spray powder, 35 microns diameter or larger is typically coated upon the printed surfaces so the printed surfaces will not develop ink offset, pick or have poor print quality. The application of the spray powder allows the printed sheets to be handled and processed without risks of smudging, smearing or distorting the inks during a suitable drying period of approximately twelve hours or less depending upon ambient humidity and temperature which can be modified by conventional procedures without departing from the scope of the invention defined in the appended claims. The spray powder provides a thin layer between the top surface of one powdered sheet and the bottom layer of a powdered sheet stacked thereupon. This layer allows for easy handling of stacked sheets. The spray powder prevents wet inks from sticking or adhering to the bottom surface of a powdered sheet stacked thereupon. The spray powder dries into the inks. A preferred spray powder is a spray powder manufactured by Vam Products Company, Inc., of Oakland, N.J., and sold under the product name Anti Set-Off Powders® No. R-23). This powder is comprised of starch. It will be appreciated that other spray powders with similar properties are suitable as well.

Referring to the steps of preparing a printed PVC sheet as illustrated in FIG. 2, PVC sheet 15 is printed by offset half tone lithography on a conventional offset lithography sheet fed printing press with a high tack, low wax PVC ink utilizing cyan, magenta, yellow, black separations and plates as already described, followed by spraying powder and drying the print ink as indicated, to prepare print layer 16 on PVC substrate 15. Referring further to FIG. 2, the two substrates, PVC sheet 10 with adhesive 11, metal foil 12, and printing 13 as a separate substrate, and sheet 15 with printing 16 thereon, as a second substrate, are collated and bonded together on the PVC sides.

As an additional step, which may be preferable, an application of a heat activated adhesive as a dry-bond adhesive to at least one PVC side of the two substrates aids bonding of the two substrates. Bonding is accomplished in a laminating press under the application of heat and pressure at 290° F. to 310° F. with pressure of about 1000 psi, for example, with an over-laminating clear PVC 2 mil film with a 6 minute dwell time under pressure. The over-laminating film can have an identification magnetic foil applied on the inside of the film. The laminate is die cut to required size and finished by embossing or further post processing as required.

The foregoing description is a specific embodiment of the present invention. It should be appreciated that this embodiment is described for purposes of illustration only and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A method for producing a multi-layered foil laminate comprising two substrates bonded together to form a multi-layered foil laminate having at least two layers, each layer printed on one outer side with indicia wherein a first layer comprises a first plastic film material and having printed indicia on a first side and a second layer comprises a second plastic film material having a first surface adhesively secured to a facing first surface of a metal foil, said metal foil having printed indicia on a second surface, wherein said first and second layers are bonded together by a heat activated adhesive on facing surfaces of said plastic film materials of said two layers and by bonding a further layer comprising a third plastic film material on said bonded first and second layers, said method comprising the steps of:
 a) printing indicia on a first surface of a first plastic film material through lithographic offset halftone printing;
 b) applying spray powder to printing ink of said printing indicia on said first surface of said first plastic film to provide a separation layer as a first layer;
 c) adhesively securing a second plastic film material first surface to a facing first surface of a metal foil by a heat activated adhesive, said metal foil of an overall thickness of from about 0.05 mm to about 1.5 mm;
 d) printing indicia on a second surface of said metal foil through lithography offset halftone printing;
 e) applying spray powder to printing ink of said printing indicia on second surface of said metal foil to provide a separation layer as a second layer;
 f) collating and bonding together said first layer on second surface of said first plastic film material and said second layer on second surface of said second plastic film material wherein said first and second layers are collated and bonded together on facing surfaces of said plastic materials of said two layers to form a first embodiment;
 g) applying a third plastic film material as an exterior transparent plastic film over said first embodiment to form a multi-layered second embodiment;
 h) applying heat and pressure to said second embodiment to form a multi-layered plastic film metal foil laminate;
 i) finishing said multi-layered plastic film metal foil laminate by severing said multi-layered plastic film metal foil laminate into pre-determined sized segments, each segment having printing located on each outer side.

2. The method of claim 1 wherein said finishing comprises embossing each segment on specified surface regions and finishing each segment with an applied scratch off or "ultra graphic" indicia to enhance appearance or utility.

3. The method of claim 1 wherein said first and second plastic film materials comprise PVC with a thickness of 13 mil.

4. The method of claim 1 wherein said third plastic film material comprises an over-laminating PVC with a thickness of 2 mil.

5. The method of claim 1 wherein said metal foil is selected from the group consisting of aluminum, brass, gold, and silver foil of an overall thickness of about 0.07 to 0.08 mm.

6. The method of claim 1 wherein said metal foil is aluminum.

7. The method of claim 1 wherein said heat activated adhesive is a dry bond adhesive.

8. The method of claim 1 wherein a dry-bond adhesive is applied to facing surfaces of said plastic film materials of said two layers.

9. The method of claim 1 wherein said multi-layered foil laminate having at least two layers, each layer printed on one outer side providing identifying indicia through an exterior transparent plastic film wherein said exterior transparent plastic film is clear, transparent over-laminating PVC.

* * * * *